(12) United States Patent
Kunik et al.

(10) Patent No.: US 11,536,362 B2
(45) Date of Patent: Dec. 27, 2022

(54) TRANSMISSION HAVING A FAN ASSEMBLY (71) Applicant: SEW-EURODRIVE GMBH & CO. KG, Bruchsal (DE)

(72) Inventors: Claus Kunik, Waghäusel (DE); Konstantin Völker, Bruchsal (DE); Jan Knittel, Dettenheim (DE); Anette Bunka, Eggenstein-Leopoldshafen (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 17/598,454

(22) PCT Filed: Feb. 21, 2020

(86) PCT No.: PCT/EP2020/025084
§ 371 (c)(1),
(2) Date: Sep. 27, 2021

(87) PCT Pub. No.: WO2020/192963
PCT Pub. Date: Oct. 1, 2020

(65) Prior Publication Data
US 2022/0186827 A1 Jun. 16, 2022

(30) Foreign Application Priority Data

Mar. 26, 2019 (DE) .......................... 102019002168.1

(51) Int. Cl.
F16H 57/02 (2012.01)
F16H 57/04 (2010.01)
F16H 57/031 (2012.01)

(52) U.S. Cl.
CPC ....... F16H 57/0416 (2013.01); F16H 57/031 (2013.01)

(58) Field of Classification Search
CPC ............... F16H 57/031; F16H 57/0412; F16H 57/0415; F16H 57/0416; F04D 29/703
See application file for complete search history.

(56) References Cited

U.S. PATENT DOCUMENTS 2,325,913 A * 8/1943 Mclcmore, Jr. ........ F04D 29/703
416/247 R
8,210,824 B1 * 7/2012 Bucher ................. F04D 19/002
416/214 R (Continued)

FOREIGN PATENT DOCUMENTS

CN 203394862 U 1/2014
CN 111720492 A * 9/2020

(Continued)

OTHER PUBLICATIONS

Machine translation of CN 203394862 U obtained on May 4, 2022.*

(Continued)

*Primary Examiner* — Adam D Rogers
(74) *Attorney, Agent, or Firm* — Carter, DeLuca & Farrell LLP (57) ABSTRACT

A transmission includes a fan assembly having a fan wheel, a cover, and a grating. The fan wheel is connected in a torsionally fixed manner to the input shaft of the transmission, and the fan cover is fixed in place on a holding frame, which, for example, includes multiple parts and is fastened to the housing of the transmission. The grating is formed by two grating parts, whose first separating line is a straight segment or is formed by two mutually aligned straight segments, and the cover includes two cover parts, whose second separating line is a plane curve, made up of straight segment sections.

25 Claims, 4 Drawing Sheets

(56) References Cited

U.S. PATENT DOCUMENTS

| | | | | |
|---|---|---|---|---|
| 9,366,332 | B2* | 6/2016 | Hayashi | F16H 57/0416 |
| 9,599,406 | B2* | 3/2017 | Tietyen | F28D 1/0383 |
| 9,756,759 | B2 | 9/2017 | Kimura et al. | |
| 10,458,534 | B1* | 10/2019 | Liou | F28F 3/048 |
| 10,578,205 | B2* | 3/2020 | Rakuff | H02K 9/14 |
| 10,718,353 | B2* | 7/2020 | Völker | F04D 29/5806 |

FOREIGN PATENT DOCUMENTS

| | | | | |
|---|---|---|---|---|
| DE | 102005031197 A1 | | 1/2007 | |
| DE | 102008010912 A1 | | 8/2008 | |
| DE | 102008017755 A1 | | 10/2009 | |
| DE | 102012000682 A1 | | 7/2013 | |
| DE | 102013005430 A1 | | 10/2014 | |
| DE | 112014000834 T5 | | 11/2015 | |
| DE | 102021002637 A1 | * | 12/2021 | |
| EP | 3214316 A1 | * | 9/2017 | F04D 29/281 |
| EP | 2122181 B1 | * | 6/2018 | F04D 29/281 |
| JP | 2019173897 A | * | 10/2019 | F16H 57/0416 |
| WO | WO-2010003580 A1 | * | 1/2010 | B60H 1/00457 |
| WO | 2017216754 A1 | | 12/2017 | |
| WO | WO-2020091223 A1 | * | 5/2020 | F04D 25/08 |
| WO | WO-2021180484 A1 | * | 9/2021 | F16H 57/0416 |

OTHER PUBLICATIONS

International Search Report issued in corresponding International Application No. PCT/EP2020/025084, dated Apr. 9, 2020, pp. 1-3, English Translation.

* cited by examiner

TRANSMISSION HAVING A FAN ASSEMBLY

FIELD OF THE INVENTION

The present invention relates to a transmission having a fan assembly.

BACKGROUND INFORMATION

In certain conventional systems, a fan assembly can be used for cooling a device.

German Patent Document No. 10 2008 010 912 describes a fan wheel and a fan cover, which includes a fan grating that is arranged in one piece on the fan cover, or in other words, is integrated therewith.

A drive is described in German Patent Document No. 10 2005 031 197.

German Patent Document No. 11 2014 000 834 describes a power transmission device.

German Patent Document No. 10 2008 017 755 describes a cooling system for a transmission.

SUMMARY

Example embodiments of the present invention provide a transmission having a fan assembly, for which a simple and economical production is to be achieved.

According to an example embodiment of the present invention, a transmission includes a fan assembly having a fan wheel, a cover, and a grating. The fan wheel is connected in a torsionally fixed manner to the input shaft of the transmission, and the fan cover is fixed in place on a holding frame, which, for example, includes multiple parts and is fastened to the housing of the transmission. The grating is formed by two grating parts, the cover includes two cover parts, and each grating part is connected to each of the two cover parts, e.g., with the aid of screws, or in other words, the first grating part is, for example, connected both to the first and to the second cover part, and the second grating part is connected both to the first and to the second cover part. For example, the circumferential angle region covered by the first grating part in the circumferential direction abuts, but, e.g., does not overlap with, the circumferential angle region covered by the second grating part in the circumferential direction, and the circumferential angle region covered by the first cover part in the circumferential direction abuts, but, e.g., does not overlap with, the circumferential angle region covered by the second cover part in the circumferential direction, the circumferential angle region covered by the first grating part in the circumferential direction, e.g., overlapping with the circumferential angle region covered by the first cover part.

This has the advantage of increasing the stability of the fan cover with the aid of the grating parts, which are arranged as a connection device. Resonant oscillations of the fan cover are therefore also suppressed. However, the complex installation is disadvantageous.

According to example embodiments In one advantageous embodiment, the grating includes two grating parts whose first separating line is a straight segment or is formed by two straight segments that are aligned with each other, the cover being formed by two cover parts whose second separating line is a plane curve includes straight segment pieces.

This is considered advantageous insofar as it allows for a simple production. This is because the grating parts are much smaller than a grating that is produced as one part. In the same manner, the cover parts are readily produced produce from sheet metal by punching and bending.

Because of the non-parallel alignment of the two separating lines relative to each other, greater stability is achievable, e.g., with regard to mechanical vibrations.

According to example embodiments, the grating parts have a polygonal shape at their respective outer circumferences such that the contact surface between the respective grating part and the respective cover part includes planar surface pieces in each case. This offers the advantage that a stable connection of the grating parts to the cover parts can be produced with the aid of screws, and resonant oscillations are suppressible.

According to example embodiments, the first separating line and the axis of rotation of the input shaft define a first plane, and the second separating line and the axis of rotation of the input shaft define a second plane. The second plane is aligned perpendicular to the first plane or at least has an angle of between 30° and 90°. This has the advantage of achieving greater stability so that vibrations are suppressible.

According to example embodiments, the cover formed by the two cover parts is shaped such that the cover has an axially continuous recess, which is, for example, situated in a centered manner in relation to the input shaft. This is considered advantageous insofar as the cover parts have only a low mass and the two grating parts can be used as a fan cover grating. Thus, both the cover parts and the grating parts are able to be produced as punched and bent parts and an efficient utilization of the sheet metal is achievable in the punching process.

According to example embodiments, a tab region is provided on the cover parts produced from sheet metal as punched and bent parts in each case, which projects into the recess and to which the first or the second grating part is attached, e.g., fastened with the aid of screws. This has the advantage of achieving a simple, secure fastening of the grating parts.

According to example embodiments, a tab region is arranged on the cover parts produced from sheet metal as punched and bent parts, which projects into the recess and to which the first or the second grating part is attached, e.g., attached with the aid of screws. For example, screw nuts are welded to the respective tab region in order to provide threaded bores for the screws. This has the advantage that the cover part is easy and economical to produce and the grating parts simply have to be screwed in.

According to example embodiments, a respective frame part, which is welded to the inner side of the respective cover part, projects at the cover parts produced from sheet metal as punched and bent parts, into the recess where the first or the second grating part is fixed in place, e.g., with the aid of screws. For example, screw nuts are welded to the frame part in order to supply threaded bores for the screws. This offers the advantage that the cover parts are stiffened and thus impact-proof on account of the strut-type frame part.

According to example embodiments, the recess is covered, e.g., completely, by the grating, e.g., by the two grating parts, for example, such that the axially entering airflow passes through the grating. This offers the advantage that the grating openings of the grating are so small that a protection against contact with a human hand reaching through is provided.

According to example embodiments, the two grating parts touch each other along the first separating line or have a clearance of less than five millimeters from each other.

According to example embodiments, the two cover parts touch each other along the second separating line or have a clearance of less than five millimeter from each other. This offers the advantage that either contact or alternatively only a very small clearance exists along the separating lines, which prevents a human hand from reaching through.

According to example embodiments, the airflow conveyed by the fan wheel emerges between the housing of the transmission and the cover, e.g., directed such that it flows along the housing of the transmission. This has the advantage that the transmission is cooled in the most effective and uniform manner possible.

According to example embodiments, the cover has an end face in the shape of an irregular polygon in the circumferential direction. For example, the radially outer circumference of the end face of the cover has an irregular polygonal form. This offers the advantage that while a circular fan is used for a cuboidal transmission, the airflow nevertheless flows along the periphery of the transmission in the most evenly distributed manner possible.

According to example embodiments, the cover parts and/or grating parts are produced as punched and bent parts in each case. This is considered advantageous insofar as it allows for a simple and economical production.

According to example embodiments, a contact shield, which is situated between the cover part and the housing of the transmission, is fastened to each cover part, e.g., on the inner wall of each cover part, the contact shield has continuous grating openings, and, for example, is traversed by the airflow conveyed by the fan wheel. This is considered advantageous insofar as contact counter to the flow direction of the airflow conveyed by the fan wheel is preventable as well. The contact shield is moreover mounted on the inner wall of the cover part. A direct connection to the transmission is therefore not required.

According to example embodiments, each cover part has radially continuous recesses, which are arranged as slots, elongated holes, or ellipses, the longest extension of the respective recess being aligned in the axial direction. This offers the advantage that air is able to enter from the radial direction, e.g., when objects or devices disposed in close proximity to the grating parts prevent an axial inflow or make it more difficult. In addition, a contact shield which prevents contact with rotating parts is possible.

According to example embodiments, each grating part has a geometrical and/or geometrical planar grating of, e.g., hexagonal, recesses, e.g., grating openings, which axially extend through the respective grating part. This has the advantage that the largest possible airflow is able to axially enter with the least air resistance possible. The flow resistance generated by a respective grating part is, for example, low. Nevertheless, a contact shield against contact with rotating parts is achieved.

Further features and aspects of example embodiments of the present invention are described in greater detail below with reference to the appended schematic Figures.

DETAILED DESCRIPTION

Figure 1:
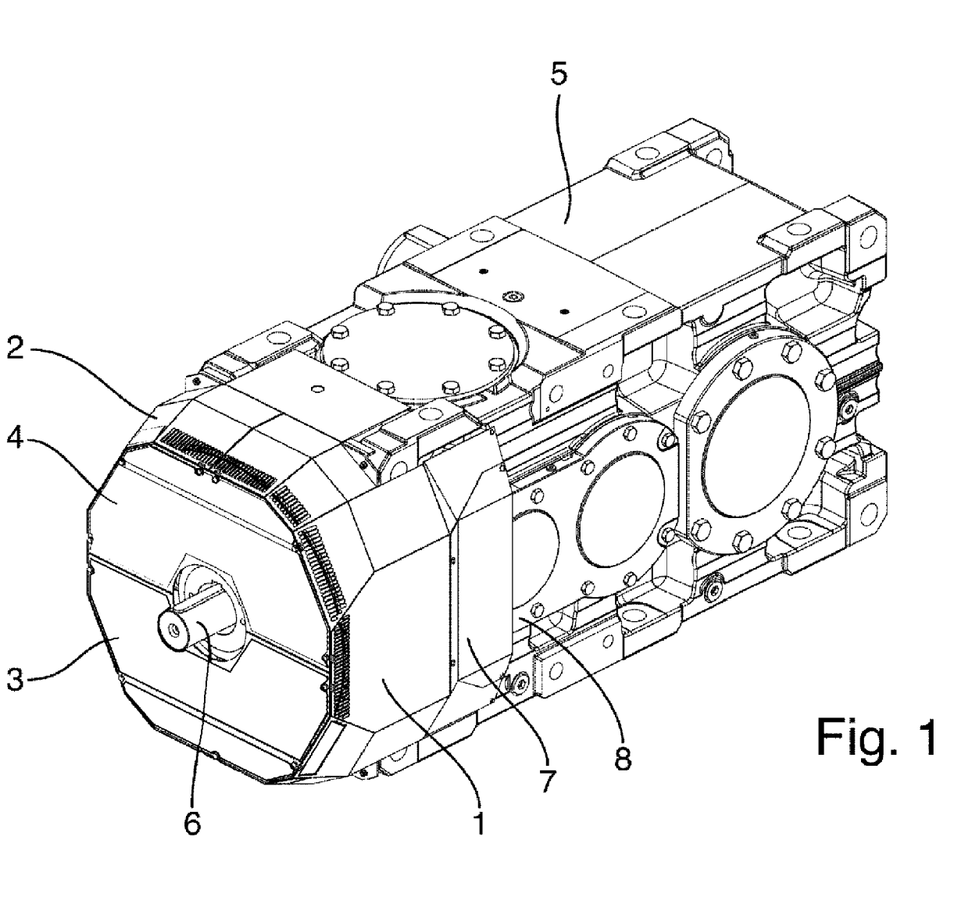
FIG. 1 is a schematic perspective view of a transmission according to an example embodiment of the present invention, which has a fan situated on the input side.
Figure 2:
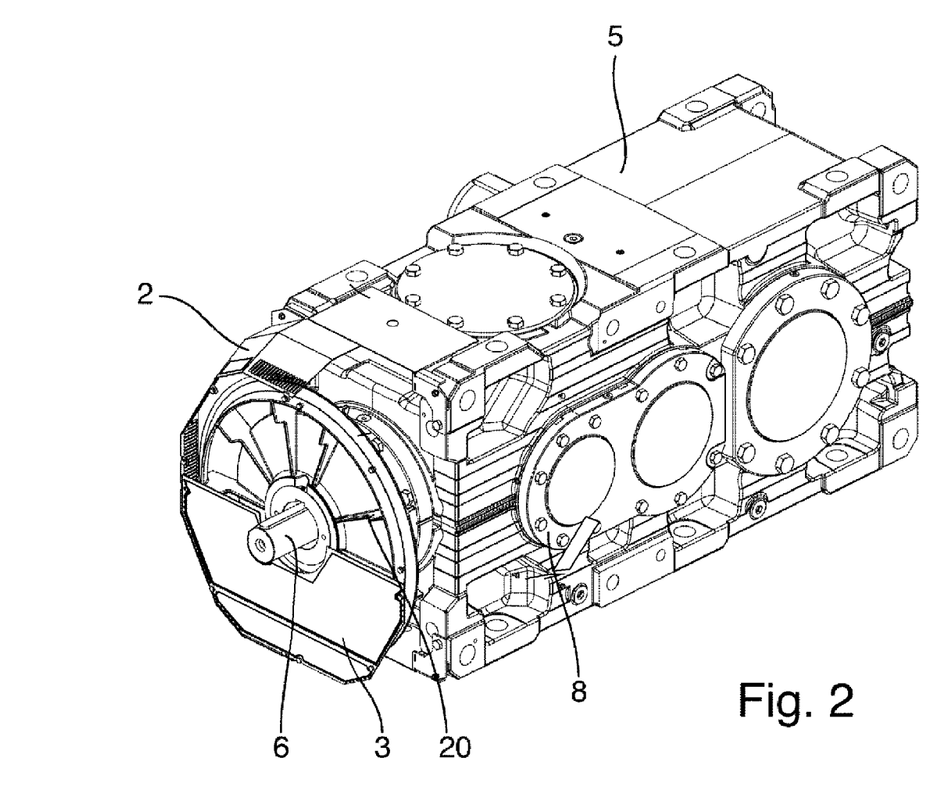
FIG. 2 schematically illustrates, in contrast to FIG. 1, a first cover part 1 and a second grating part 4 that are masked.
Figure 3:
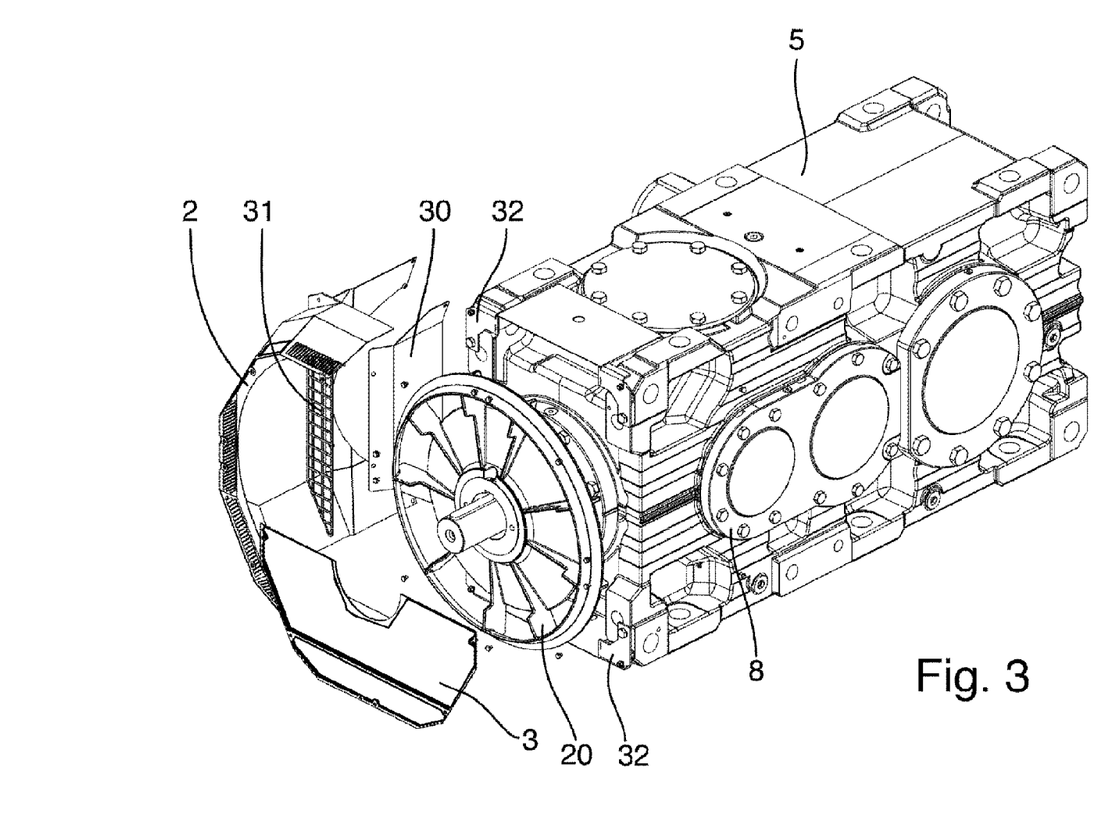
FIG. 3 is a schematic exploded view of the components of the fan that are situated outside housing 5 of the transmission.
Figure 4:
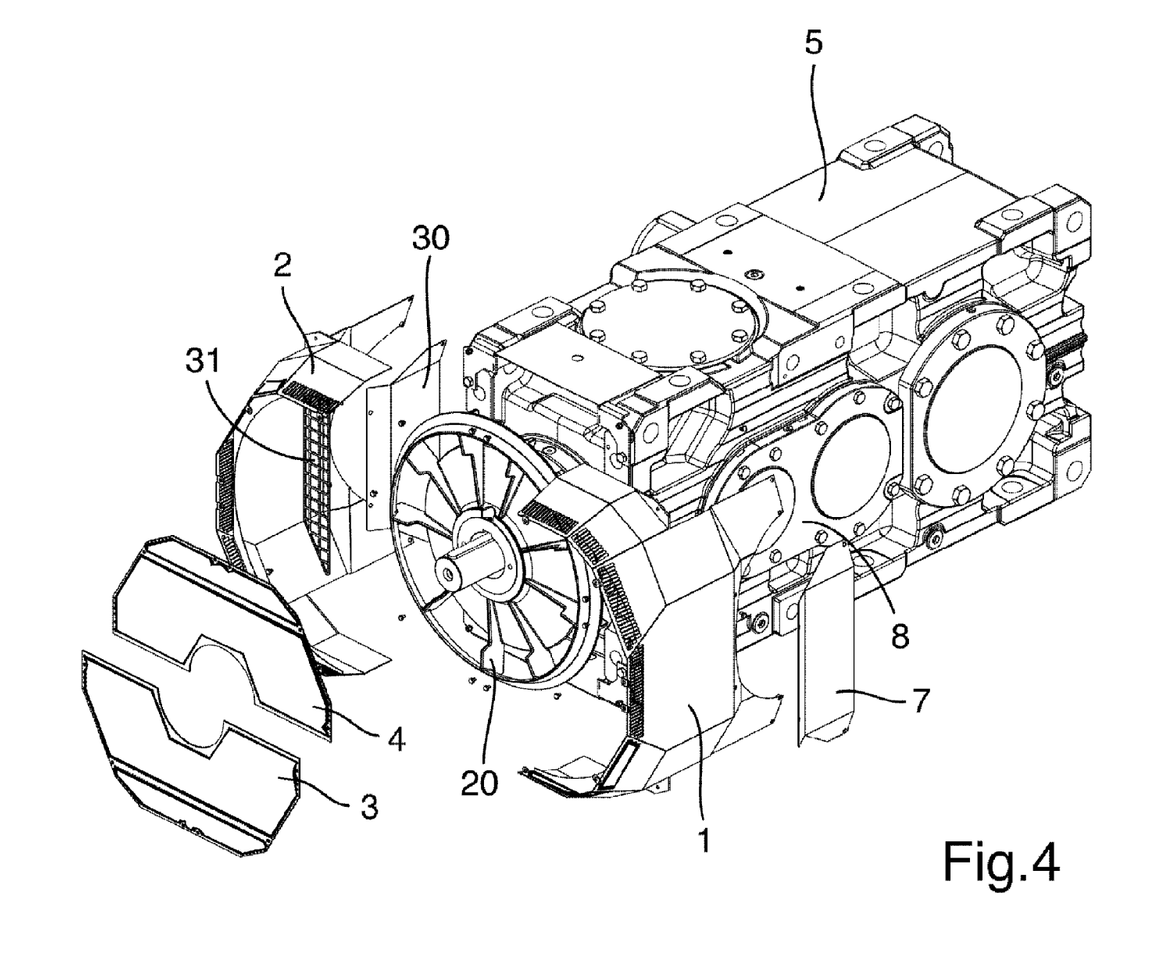
FIG. 4 is a schematic exploded view of the components of the fan that are situated outside housing 5 of the transmission.

As schematically illustrated in the Figures, the transmission has an input shaft 6, which is rotatably mounted with the aid of bearings in a housing 5 of the transmission.

A fan wheel 20 is connected in a torsionally fixed manner to input shaft 6 of the transmission and surrounded by a cover system, which is mounted on a holding frame 32 on housing 5 of the transmission. Holding frame 32 includes multiple parts and is attached to housing 5 with the aid of fastening screws.

The cover system has a first cover part 1 and a second cover part 2, both of which are connected to holding frame 32 by screws.

Each one of the two cover parts (1, 2) covers a circumferential angle of 180° in relation to the axis of rotation of input shaft 6. The separating line between the two cover parts (1, 2) has a vertical extension in the illustrated exemplary embodiment.

Thus, the two cover parts (1, 2) form a fan cover, which guides the airflow conveyed by fan wheel 20 so that it flows out of fan cover 20 along housing 5. The housing of the transmission is roughly cuboidal. However, since fan wheel 20 is round, the fan cover, which is formed by two cover parts (1, 2) that are in contact, if possible, or at least are situated in very close proximity to one another, has a polygonal circumference. As a result, the airflow streaming outward between the fan cover and housing 5 is as independent as possible of the circumferential angle. Stated differently, the airflow emerging from the fan cover is distributed as uniformly as possible across the circumferential directions. This makes it possible to achieve an optimal cooling effect.

Each cover part 1, 2 has on its circumference a region which is provided with recesses and thus is air-permeable, which allows an airflow coming from a radial direction to enter the fan cover.

The radial direction relates to the axis of rotation of the input shaft in this example.

The cover that includes the two cover parts (1, 2) is shaped such that the cover has an axially continuous recess, which is situated in the center. In addition, tab regions to which a first or a second grating part (3, 4) is attached, e.g., with the aid of screws, and which project into the recess are provided on the cover parts (1, 2) produced from sheet metal as punched and bent parts.

The recess is therefore completely covered by grating parts 3 and 4. The axially entering airflow passes through the fan grating produced in this manner.

Screw nuts are welded to the tab regions in order to supply a threaded bore for screws connecting the grating parts (3, 4) to the tab regions of the cover parts (1, 2). As a result, the grating parts (3, 4) can be screw-fitted with the aid of the screws that axially extend through a recess of the respective tab region and are screwed into the screw nuts, the screw heads of the screws pressing the respective grating part against the tab region.

The two grating parts 3 and 4 touch along a straight segment or have a clearance of less than 5 mm along a straight segment. This segment is also referred to here as the first separating line.

The first separating line and the axis of rotation of the input shaft define a first plane.

First cover part 1 touches second cover part 2 along a plane curve or has a clearance of less than 5 mm along a plane curve. This plane curve is also referred to here as a second separating line.

The second separating line includes straight segment pieces.

The second separating line and the axis of rotation of the input shaft define a second plane.

The second plane is not parallel to the first plane but has a perpendicular alignment or at least has an angle of between 30° and 90°.

Greater stability is thus achieved because the cover parts (1, 2) as well as the grating parts (3, 4) are produced as punched and bent parts from sheet metal. Because of the angle, the risk of a resonant vibration is therefore reduced or prevented.

The grating parts (3, 4) each have a, e.g., geometrical, grating of continuous recesses. This therefore makes it possible for an airflow to axially pass through and be aspirated in the direction of the fan.

Situated on the inner side of first cover part 1 is a contact shield 31 through which the airflow conveyed by the fan passes and flows out of first cover part 1 in a directed manner such that the airflow flows along the outside of the transmission.

In addition, first cover part 1 has a semi-circular recess so that a corresponding circular bearing cover section has sufficient clearance from cover part 1 for the air conveyed by the fan to emerge as uniformly as possible at the circumference of the fan cover and housing 5 is uniformly cooled as a result.

A contact shield 31 is also able to be attached to the inside of second cover part 2, through which the airflow conveyed by the fan passes and flows out of second cover part 2 in a directed manner such that it flows along the outside of the transmission.

In addition, second cover part 2 has a semicircular recess so that a corresponding circular bearing cover section has sufficient clearance from second cover part 2 to allow the air conveyed by the fan to emerge at the circumference of the fan cover as uniformly as possible and housing 5 is uniformly cooled as a result.

However, the fan cover may also be fastened to another transmission in which the round bearing cover section is not provided or is situated at a greater distance. In this case, the recess on first cover part 1 is sealed by mounting a cover part 30 so that the airflow is guided more optimally and uniformly along housing 5. In the same manner, the recess on second cover part 1 is sealed by mounting a second cover part 30 in this case and the airflow is thus guided more optimally and uniformly along housing 5.

If a clutch or an electric motor is connected to the input shaft and situated axially in such close proximity to the fan cover that no axial airflow can occur, i.e., through grating parts 3 and 4, it is possible, however, that a radial airflow through cover parts 1 and 2 takes place in the direction of the fan.

Via the recesses of the respective air-permeable region of the cover parts (1, 2) and the grating parts (3, 4) an inflow of the airflow aspirated by the fan wheel from a radial and an axial direction is therefore able to take place.

The end face of the fan cover shaped in the form of an irregular polygon enables not only a uniform distribution of the airflow in the circumferential direction but also a simple manufacture of the bipartite fan cover as punched and bent parts. The underside of the transmission functions as a base surface or footprint and is not traversed by the airflow.

The recesses of the air-permeable region at grating parts 3 and 4 are arranged as hexagons and evenly spaced apart from one another. The air-permeable region thus has a planar, geometrical grating of recesses in the form of hexagons that axially extend through the respective grating part (3, 4). An optimized utilization of the grating surface is therefore possible, that is to say, high stability is maintained, e.g., despite the greatest air throughput possible.

In contrast, cover parts 1 and 2 have radially continuous recesses which are arranged as slots, elongated holes, or ellipses whose longest extension is aligned in the axial direction. Because the recesses are situated in the edge region of the cover parts (1, 2) facing the grating parts (3, 4) in each case, this elongated configuration creates a low flow resistance to radially entering air as well as sufficient stability for the accommodation and support of the grating parts (3, 4) with the aid of the cover parts (1, 2).

In the elliptical configuration, the main axis of the respective ellipse is aligned in the axial direction.

In further exemplary embodiments, a multipart configuration is obtained instead of the bipartite configuration of the fan cover.

In additional exemplary embodiments, no tab regions are provided on the inside of the cover parts (1, 2), but a frame part in the shape of a polygon is welded to each one of the cover parts (1, 2). The individual frame part has a planar configuration, and the normal direction of the plane accommodating the frame part has an alignment in the axial direction. This stabilizes the individual cover part (1, 2). Screw nuts are welded to the frame parts in order to provide a threaded bore for screws that connect the grating parts (3, 4) to the cover parts (1, 2). Thus, the grating parts (3, 4) can then be mounted with the aid of the screws that axially extend through a recess of the respective frame part and are screwed into the screw nuts, the screw heads then pressing the respective grating part against the corresponding frame part.

LIST OF REFERENCE NUMERALS

1 first cover part
2 second cover part
3 first grating part
4 second grating part
5 housing
6 input shaft
7 cover part
8 bearing cover
20 fan wheel
30 cover part
31 protective shield
32 holding frame

The invention claimed is:

1. A transmission, comprising:
   an input shaft; and
   a fan assembly including:
     a fan wheel, connected in a torsionally-fixed manner to the input shaft;
     a fan cover arranged on a holding frame and including two cover parts; and
     a grating including two grating parts;
   wherein each grating part is connected to each of the two cover parts; and
   wherein the fan cover includes an axially continuous recess centered in relation to the input shaft.

2. The transmission according to claim 1, wherein a first grating part of the two grating parts is connected both to a first cover part and a second cover part of the two cover parts, and a second grating part of the two grating parts is connected both to the first cover part and the second cover part.

3. The transmission according to claim 1, wherein a tab region is formed on the cover parts arranged as punched and bent part sheet metal parts, projects into the recess and to which one of the grating parts is attached and/or screw-connected.

4. The transmission according to claim 3, wherein the tab region includes welded screw nuts to provide threaded bores for screws.

5. The transmission according to claim 1, wherein a frame part, welded to an inner side of a respective cover part, projects at the cover parts arranged as punched and bent sheet metal parts, into the recess where one of the grating parts is fixed in place and/or screw-connected.

6. The transmission according to claim 5, wherein the respective frame part includes welded screw nuts to provide threaded bores for screws.

7. The transmission according to claim 1, wherein the recess is covered or completely covered by the grating or by the two grating parts, such that axially entering airflow passes through the grating.

8. The transmission according to claim 1, wherein the two grating parts touch each other along a first separating line or have a clearance of less than 5 mm from each other.

9. The transmission according to claim 1, wherein the cover includes an end face shaped as an irregular polygon and/or a radially outer circumference of the end face of the cover has an irregular polygonal form.

10. The transmission according to claim 1, wherein the cover parts and/or the grating parts are arranged as punched and bent parts.

11. The transmission according to claim 1, wherein each grating part includes a geometrical or geometrical planar grating.

12. The transmission according to claim 11, wherein the grating parts include hexagonal recesses and/or grating openings that axially extend through the grating part.

13. A transmission, comprising:
an input shaft; and
a fan assembly including:
a fan wheel, connected in a torsionally-fixed manner to the input shaft;
a fan cover arranged on a holding frame and including two cover parts; and
a grating including two grating parts;
wherein each grating part is connected to each of the two cover parts; and
wherein the holding frame includes multiple pieces and is fastened to a housing of the transmission.

14. The transmission according to claim 13, wherein the fan wheel is adapted to convey an airflow that emerges between the housing of the transmission and the cover and is directed such that the airflow flows along the housing of the transmission.

15. The transmission according to claim 13, wherein a contact shield is arranged between the cover part and the housing of the transmission and is fastened to each cover part and/or to an inner wall of each cover part, the contact shield including continuous grating openings.

16. The transmission according to claim 15, wherein the contact shield is traversed by an airflow conveyed by the fan wheel.

17. A transmission, comprising:
an input shaft; and
a fan assembly including:
a fan wheel, connected in a torsionally-fixed manner to the input shaft;
a fan cover arranged on a holding frame and including two cover parts; and
a grating including two grating parts;
wherein each grating part is connected to each of the two cover parts; and
wherein a circumferential angle region covered by a first grating part of the two grating parts in a circumferential direction abuts a circumferential angle region covered by a second grating part of the two grating parts in the circumferential direction, and a circumferential angle region covered by a first cover part of the two cover parts in the circumferential direction abuts a circumferential angle region covered by a second cover part of the two cover parts in the circumferential direction.

18. The transmission according to claim 17, wherein the circumferential angle region covered by the first grating part in the circumferential direction overlaps with the circumferential angle region covered by the first cover part.

19. A transmission, comprising:
an input shaft; and
a fan assembly including:
a fan wheel, connected in a torsionally-fixed manner to the input shaft;
a fan cover arranged on a holding frame and including two cover parts; and
a grating including two grating parts;
wherein each grating part is connected to each of the two cover parts; and
wherein a circumferential angle region covered by a first grating part of the two grating parts in a circumferential direction abuts, but does not overlap with, a circumferential angle region covered by a second grating part of the two grating parts in the circumferential direction, and a circumferential angle region covered by a first cover part of the two cover parts in the circumferential direction abuts, but does not overlap with, a circumferential angle region covered by a second cover part of the two cover parts in the circumferential direction.

20. The transmission according to claim 19, wherein the circumferential angle region covered by the first grating part in the circumferential direction overlaps with the circumferential angle region covered by the first cover part.

21. A transmission, comprising:
an input shaft; and
a fan assembly including:
a fan wheel, connected in a torsionally-fixed manner to the input shaft;
a fan cover arranged on a holding frame and including two cover parts; and
a grating including two grating parts;
wherein each grating part is connected to each of the two cover parts; and
wherein a first separating line is arranged as a straight segment between the two grating parts or as two mutually aligned straight segments, a second separating line is arranged between the two cover parts as a plane curve composed of straight segment sections, the first separating line and an axis of rotation of the input shaft defining a first plane, the second separating line and the axis of rotation of the input shaft defining a second plane, the second plane being aligned perpendicular to the first plane or at least having an angle of between 30° and 90°.

22. The transmission according to claim 21, wherein the two cover parts touch each other along the second separating line or have a clearance of less than 5 mm from each other.

23. A transmission, comprising:
an input shaft; and
a fan assembly including:
- a fan wheel, connected in a torsionally-fixed manner to the input shaft;
- a fan cover arranged on a holding frame and including two cover parts; and
- a grating including two grating parts;
wherein each grating part is connected to each of the two cover parts; and
wherein each grating part is screw-connected to each of the two cover parts.

24. A transmission, comprising:
an input shaft; and
a fan assembly including:
- a fan wheel, connected in a torsionally-fixed manner to the input shaft;
- a fan cover arranged on a holding frame and including two cover parts; and
- a grating including two grating parts;
wherein each grating part is connected to each of the two cover parts; and
wherein the grating parts have a polygonal shape such that a contact surface between a respective grating part and a respective cover part includes planar surface pieces, to provide a screw-connection.

25. A transmission, comprising:
an input shaft; and
a fan assembly including:
- a fan wheel, connected in a torsionally-fixed manner to the input shaft;
- a fan cover arranged on a holding frame and including two cover parts; and
- a grating including two grating parts;
wherein each grating part is connected to each of the two cover parts; and
wherein each cover part includes radially continuous recesses arranged as slots, elongated holes, and/or ellipses, a longest extension of at least one of the recesses being aligned in an axial direction.

* * * * *